(12) United States Patent  
Hammer

(10) Patent No.: US 6,745,721 B1  
(45) Date of Patent: Jun. 8, 2004

(54) PET FOOT WASHER

(76) Inventor: Markus Hammer, Memelstrasse 27, 89231, Neu-Ulm (DE)

( * ) Notice: Subject to any disclaimer, the term of this patent is extended or adjusted under 35 U.S.C. 154(b) by 0 days.

(21) Appl. No.: 10/358,220

(22) Filed: Feb. 5, 2003

(51) Int. Cl.[7] ............................................. A01K 29/00
(52) U.S. Cl. .................................................. 119/664
(58) Field of Search ................. 119/664, 673, 119/665; 15/30, 34, 36, 161

(56) References Cited

U.S. PATENT DOCUMENTS

| | | | | |
|---|---|---|---|---|
| 826,806 A | * | 7/1906 | Scoggins | 15/4 |
| 1,223,195 A | * | 4/1917 | Molinaro | 15/36 |
| 2,958,883 A | * | 11/1960 | Walters | 15/97.2 |
| 3,641,609 A | * | 2/1972 | Hansen | 15/112 |
| 4,024,599 A | * | 5/1977 | Gamboa | 15/311 |
| 4,233,707 A | * | 11/1980 | Leblanc | 15/311 |
| 4,358,867 A | * | 11/1982 | Berta | 15/36 |
| 4,567,618 A | * | 2/1986 | Picchietti, Sr. | 15/4 |
| 4,951,339 A | * | 8/1990 | Braun | 15/88.3 |
| D389,961 S | * | 1/1998 | McBeath et al. | D32/1 |
| 5,774,909 A | * | 7/1998 | Stable | 4/622 |
| 5,940,918 A | * | 8/1999 | Binette | 15/21.1 |
| 5,950,269 A | * | 9/1999 | Openshaw et al. | 15/36 |

FOREIGN PATENT DOCUMENTS

| | | | | |
|---|---|---|---|---|
| FR | 2566260 A | * | 12/1985 | A47L/23/02 |
| FR | 2746291 A1 | * | 9/1997 | A47L/23/00 |

* cited by examiner

*Primary Examiner*—Peter M Poon
*Assistant Examiner*—Joan M. Olszewski
(74) *Attorney, Agent, or Firm*—Troxell Law Office PLLC

(57) ABSTRACT

A pet foot washer having a body and an upper lid provided with a trough and a tray. The body includes a bucket and a brush wheel unit secured in position and striding over both sides of the body to roll between the trough and the bucket containing water. A foot of the pet is put on brush wheel while turning the crank to clean a sole of the foot of the pet.

4 Claims, 4 Drawing Sheets

PET FOOT WASHER

BACKGROUND OF THE INVENTION (a) Field of the Invention

The present invention is related to a pet foot washer, and more particularly, to one exclusively for cleaning a pet's foot by means of a brushing wheel unit and a wiping pad to quickly remove dirt attached to a foot of the pet.

(b) Description of the Prior Art

Owning a pet is important to people and many people even treat their pet as a member of the family. Among pets, cats and dogs are most favored. In addition to feeding the pet, allowing the pet to play in a yard or in a park keeps the pet in healthy condition. However, the dirt attached to the feet of the pet could be a problem with housekeeping. The owner may simply grab the foot of the pet and turn on a tap to directly wash the foot of the pet, but it would consume too much water and may get the pet wet all over. If a dry mop is used to wipe clean the foot of the pet, it won't guarantee the foot of the pet is completely clean.

SUMMARY OF THE INVENTION

The primary purpose of the present invention is to provide a washer exclusively for cleaning the foot of a pet. To achieve the purpose, the present invention is comprised of a body and an upper lid. A brush wheel striding over both sides and a crank is connected to each end of the brush wheel. The body also includes a bucket containing water. An upper lid is provided with a trough to accommodate the brush wheel and a tray. To clean the foot of the pet, simply place the foot of the pet on the brush wheel while turning the crank to remove dirt attached to the sole of the pet foot.

Another purpose of the present invention is to provide a wiper pad on the tray so as to wipe clean the foot of the pet after the washing with the brush wheel.

Another purpose yet of the present invention is to place a sponge on the brush wheel for the pet to feel more comfortable when having its foot washed.

DETAILED DESCRIPTION OF THE PREFERRED EMBODIMENTS

Figure 1:
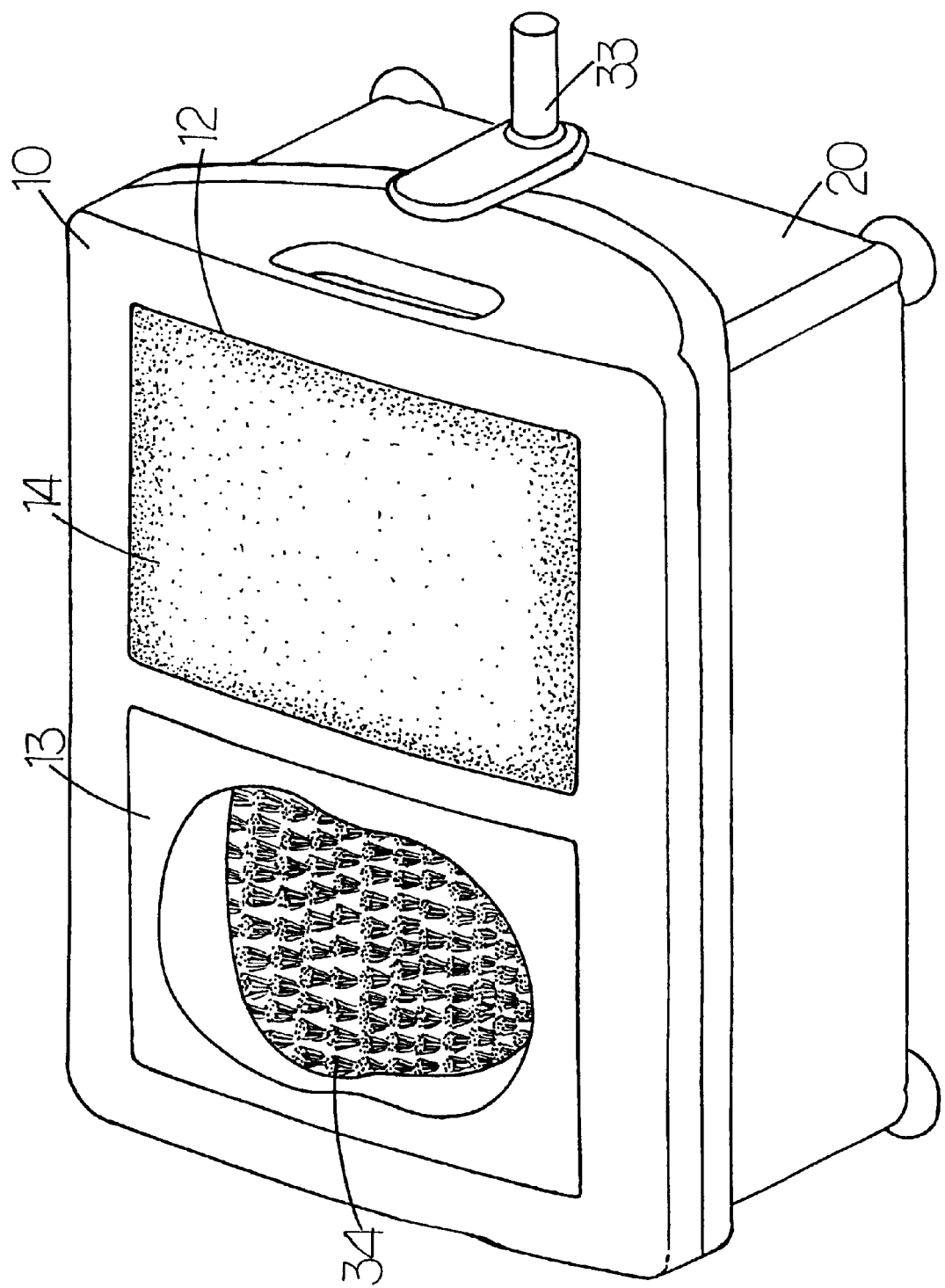
FIG. 1 is a perspective view of a preferred embodiment of the present invention.
Figure 2:
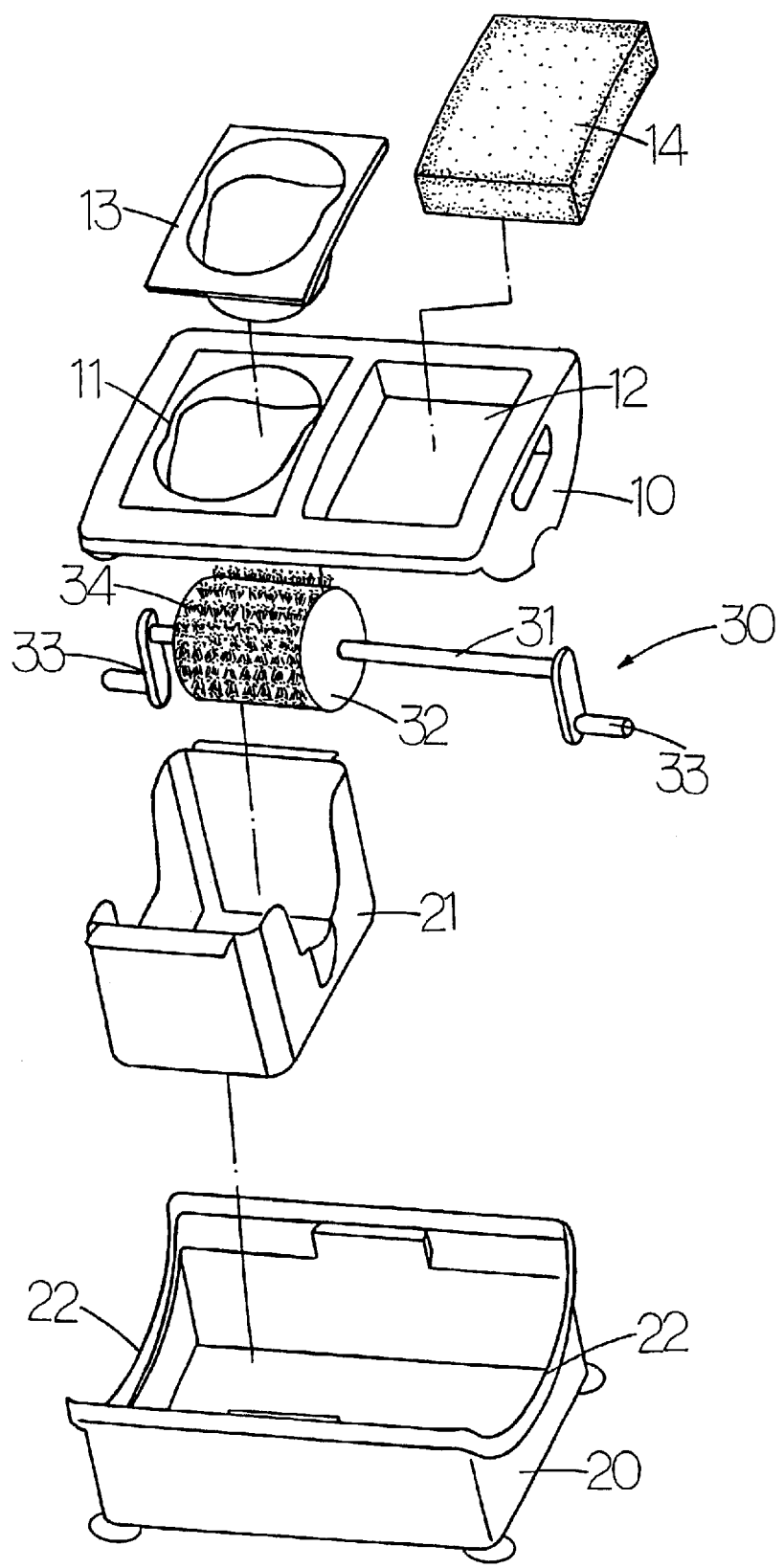
FIG. 2 is an exploded view of the preferred embodiment of the present invention.
Figure 3:
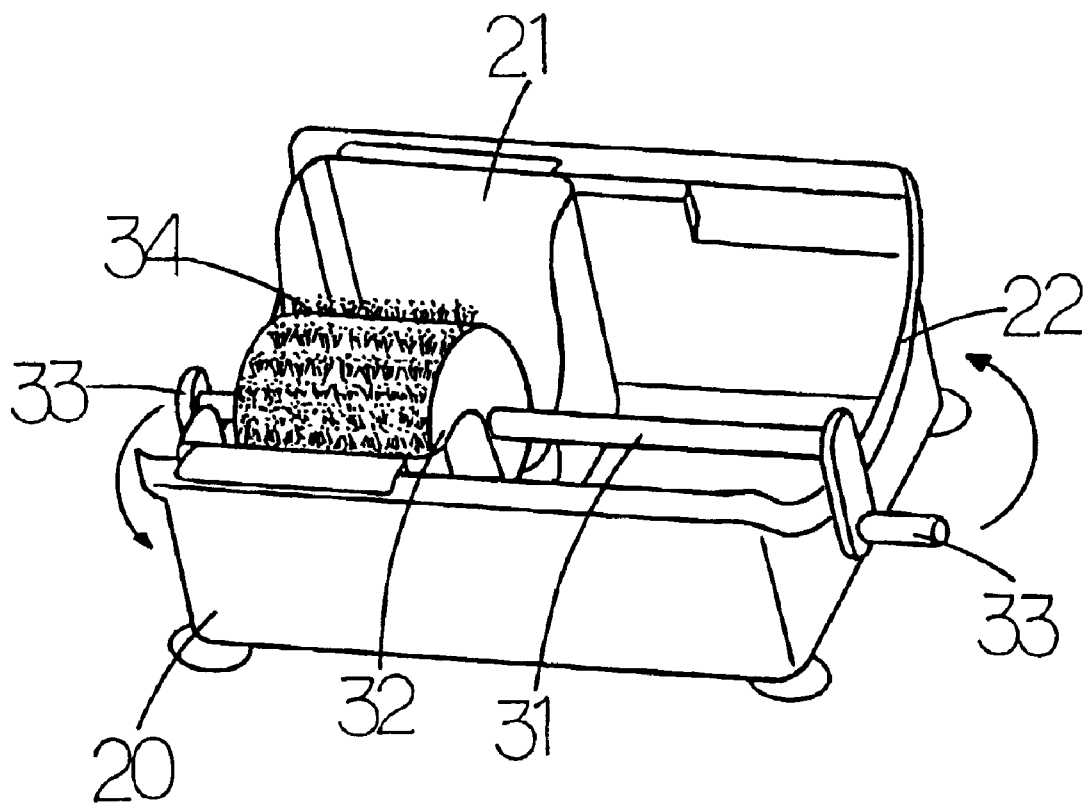
FIG. 3 is a schematic view showing the operation of a brush wheel of the preferred embodiment of the present invention.

Referring to FIGS. 1, 2, and 3, a preferred embodiment of the present invention is comprised of an upper lid (10) provided with a trough (11) having its peripheral edge placed with a sponge (13) and a tray to accommodate a wiper pad (14); a body (20) containing a bucket (21) and having both of its shorter sides with a concave upper surface (22) to be stridden over by a brush wheel unit (30); and the brush wheel unit (30) including a rod (31), a fixed brush wheel (32) on the rod (31_, and two cranks (33), one crank (33) connected to each end of the rod (31).

Upon assembling, a proper amount of water with or without detergent is placed into the bucket (21) and the bucket (21) is then placed in a hollow interior of the body (20). The rod (31) of the brush wheel unit (30) is stridden over both concaves (22) of the body leaving both cranks (33) exposed outside the body (20) with the brush wheel (32) merely contacting the liquid inside the bucket. Finally, the sponge (13) is placed on the peripheral of the trough (11) and the wiper pad (14) is placed on the tray (12) of the upper lid (10). The upper lid (10) is placed on the body (20).

Figure 4:
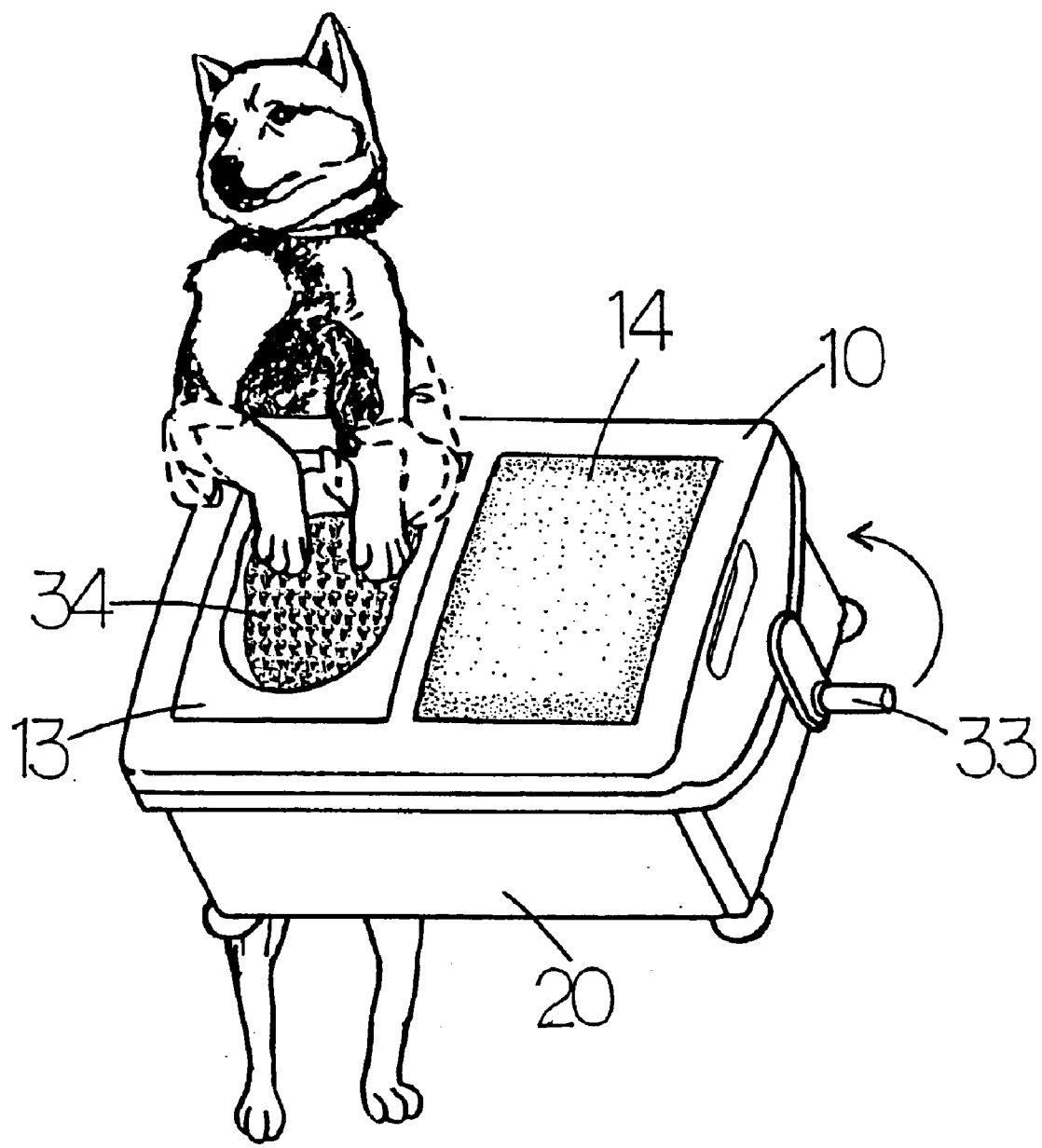
FIG. 4 is a schematic view showing that the preferred embodiment of the present invention is in use.

In use, one foot (or two feet) of the pet is placed on the brush wheel (32) in the trough (11) as illustrated in FIG. 4 while turning the crank (33) of the brush wheel unit (30) to allow brush hair (34) on the brush wheel (32) to dip the liquid for washing the foot of the pet. After the washing, the wiper pad (14) is used to dry the foot of the pet to keep the foot of the pet clean while inside the house.

In the present invention, a bucket containing water, with or without detergent, is provided in the body for the brush wheel to dip into the liquid to thoroughly clean the foot of the pet by turning the crank. Therefore, the application for a utility patent is filed accordingly. However, it should be noted that the preferred embodiment given in the specification is in no way to limit the present invention, and any structure, installation or characteristics that is similar or equivalent to that of the present invention shall be included within the purposes and claims of the present invention.

I claim:

1. A pet foot washer comprising:
   a) an upper lid having:
      i) a trough with an opening; and
      ii) a tray;
   b) a body having a hollow interior and two opposing ends, each of the two opposing ends of the body having a concave upper surface covering the entire upper surface of each of the opposing ends, the upper lid located on a top of the body and having two opposing walls with the bottom surface of each wall having a convex shape corresponding to the concave upper surfaces on the body;
   c) a bucket removably inserted into the hollow interior of the body and aligning with the opening in the trough; and
   d) a brush wheel unit having:
      i) a rod having two ends;
      ii) a brush wheel fixed on the rod, the brush wheel extending into the bucket and aligning with the opening in the trough; and
      iii) two manual cranks, one manual crank located at each of the two ends of the rod, the rod positioned across the concave upper surface of the two opposing ends of the body and captured by the convex shape surfaces of the upper lid, wherein each of the two manual cranks are positioned on an exterior of the body.

2. The pet foot washer according to claim 1, further comprising a wiper pad inserted into the tray of the upper lid.

3. The pet foot washer according to claim 1, further comprising a sponge located around a periphery of the opening in the trough of the upper lid.

4. The pet foot washer according to claim 1, further comprising brush hair around the outer periphery of the brush wheel.

* * * * *